(12) United States Patent
Cannon, Jr. et al.

(10) Patent No.: US 11,349,837 B2
(45) Date of Patent: May 31, 2022

(54) IDENTITY VAULT SERVICE

(71) Applicant: AT&T Intellectual Property I, L.P., Atlanta, GA (US)

(72) Inventors: Thomas A. Cannon, Jr., Lynnwood, WA (US); William O'Hern, Spring Lake, NJ (US); Aleksey Ivanov, Middletown, NJ (US); Barbara Laing, Colts Neck, NJ (US); Mark Easley, Coweta, OK (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 245 days.

(21) Appl. No.: 16/399,406

(22) Filed: Apr. 30, 2019

(65) Prior Publication Data

US 2020/0351266 A1 Nov. 5, 2020

(51) Int. Cl.
*H04L 29/06* (2006.01)
*G06F 21/62* (2013.01)
*H04L 9/40* (2022.01)

(52) U.S. Cl.
CPC ...... *H04L 63/0884* (2013.01); *G06F 21/6218* (2013.01); *H04L 63/102* (2013.01); *H04L 63/107* (2013.01); *H04L 63/1425* (2013.01)

(58) Field of Classification Search
CPC . H04L 63/0884; H04L 63/102; H04L 63/107; H04L 63/1425; G06F 21/6218
See application file for complete search history.

(56) References Cited

U.S. PATENT DOCUMENTS

| | | | | |
|---|---|---|---|---|
| 7,912,971 B1* | 3/2011 | Dunn | ................... | H04L 63/102 |
| | | | | 709/229 |
| 10,733,685 B1* | 8/2020 | Gailloux | ............. | G06Q 50/265 |
| 2007/0027917 A1* | 2/2007 | Ariel | .................... | G06F 16/285 |
| 2008/0133708 A1* | 6/2008 | Alvarado | ............ | G06Q 10/109 |
| | | | | 709/218 |
| 2009/0018849 A1* | 1/2009 | Feder | ................... | H04L 63/029 |
| | | | | 705/317 |
| 2009/0024526 A1* | 1/2009 | Erickson | ............... | G06Q 40/00 |
| | | | | 705/44 |
| 2010/0130169 A1* | 5/2010 | Narayanaswamy | .... | H04L 65/40 |
| | | | | 455/411 |
| 2010/0203901 A1* | 8/2010 | Dinoff | .................. | H04W 4/022 |
| | | | | 455/456.3 |

(Continued)

*Primary Examiner* — Jason Chiang
(74) *Attorney, Agent, or Firm* — Hartman & Citrin LLC

(57) ABSTRACT

Concepts and technologies are disclosed for an identity vault service. According to one aspect disclosed herein, an identity vault service system can collect self-attested and operator-attested user information. The operator-attested user information can be associated with a user and a mobile telecommunications service provided to the user by a mobile network operator. The system can create a trusted digital identity of the user based upon the self-attested and operator-attested user information. The system can receive an identity access request from a third party. The request can be for access to at least a portion of the trusted digital identity for use by the third party in performance of an act. The system can send a consent request to a user device and can receive a consent response that indicates whether the user permits access to at least the portion of the trusted digital identity of the user.

20 Claims, 8 Drawing Sheets

(56) References Cited

U.S. PATENT DOCUMENTS

| | | | |
|---|---|---|---|
| 2010/0222046 A1* | 9/2010 | Cumming | H04M 1/72448 455/418 |
| 2010/0325691 A1* | 12/2010 | Willars | H04L 67/2819 726/1 |
| 2011/0071924 A1* | 3/2011 | Desmond | G06Q 20/3274 705/27.1 |
| 2011/0225637 A1* | 9/2011 | Counterman | H04L 63/10 726/7 |
| 2013/0144944 A1* | 6/2013 | Wohlert | H04L 67/14 709/204 |
| 2015/0009998 A1* | 1/2015 | Jeong | G06Q 30/0201 370/392 |
| 2015/0200915 A1* | 7/2015 | Yeager | H04L 67/22 713/155 |
| 2016/0026736 A1* | 1/2016 | Natarajan | G06F 16/24578 707/694 |
| 2017/0032401 A1* | 2/2017 | Shifman | G06Q 30/02 |
| 2017/0105099 A1* | 4/2017 | Liu | H04W 4/33 |
| 2019/0172282 A1* | 6/2019 | Patel | G07C 9/27 |
| 2019/0303929 A1* | 10/2019 | Brown | H04L 63/0853 |
| 2019/0385211 A1* | 12/2019 | DeLuca | G06N 5/04 |

* cited by examiner

IDENTITY VAULT SERVICE

BACKGROUND

In recent years, the proliferation of mobile applications, websites, online shopping, digital media, social networks, and other Internet-based activity has caused a dramatic increase in people sharing their unique identifying information ("identity information"). A person may provide some identity information to a company, website, social media platform, or other third party in exchange for free access to a service, such as an e-mail account, individualized search results, or a social media account. Unfortunately, in this scenario, the third party retains the bulk of the actual value in the exchange. Indeed, while the user receives free access to a service they want, this access is provided at the cost of the user relinquishing their identity information and ultimately leaving the user with little or no control over how that identity information is then used by the third party and potentially others with whom the third party intends to share the identity information unbeknownst to the user.

As targeted advertising, personalization of all types, big data, and other uses for identity information continue to increase, the aforementioned practice that is already commonplace will become even more of a threat to the misuse of identity information, such as identity theft, or simply use without consent of the person associated with the identity information. Very few attempts have been made to rectify this situation, and the attempts that have been made are superficial at best. Currently, users can opt-in or opt-out of sharing their identity information. Beyond the initial opt-in, a person has no further option to control exactly what identity information is shared, with whom that identity information is shared, and where that identity information might be further distributed perhaps beyond the third party that originally requested permission to access the identity information.

Some service providers have made a best effort attempt to follow their customer's identity information as it is shared throughout the digital ecosystem, but those too do not have any means to control the use of this identity information. When identity information is used in a mutually-trusted relationship, the identity information gains value based on the level of legitimacy that can be provided. Legitimacy commonly relies on the person to provide information that they say is true. A third party user of the identity information can never truly prove that the information is factual. Contextual clues related to IP address location, account association with credit cards, and registered home address can be used. However, experience has shown that reliance on these methods has only increased fraud rates due to the ease of falsification, ability to be stolen, and the naïve trust placed in their accuracy. Additional methods exist to further certify the legitimacy of digital identity. These services require that an individual meet with an identity registrar and provide government-issued documentation, which is then associated with a public/private key set, a mobile phone number, and other digital identities. While more effective than the former approach, this task is extremely cumbersome and is only put into practice by very few service providers.

SUMMARY

Concepts and technologies disclosed herein are directed to aspects of an identity vault service. According to one aspect disclosed herein, an identity vault service system can collect self-attested user information provided by a user. The self-attested user information can include any information associated with the identity of the user that the user themselves attests to be true and accurate. The identity vault service system also can collect operator-attested user information provided by a mobile network operator. The operator-attested user information is associated with the user and a mobile telecommunications service provided to the user by the mobile network operator. The operator-attested user information can include any information associated with the identity of the user that the mobile network operator attests to be true and accurate. The identity vault service system can create a trusted digital identity of the user based upon the self-attested user information and the operator-attested user information. In some embodiments, the identity vault service system utilizes a machine learning model to create the trusted digital identity. The identity vault service system can receive an identity access request from a third party. The identity access request is a request made by the third party for access to at least a portion of the trusted digital identity for use by the third party in performance of an act, such as, for example, a commerce act, an authentication act, an identification act, or an authorization act. In response to the identity access request, the identity vault service system can determine whether to allow access to at least the portion of the trusted digital identity of the user.

In some embodiments, the identity vault service system can create a service agreement for an identity vault service provided by the mobile network operator via the identity vault service system, wherein the service agreement is between the user and the mobile network operator. In these embodiments, the identity vault service system can collect the self-attested user information provided by the user as part of the service agreement creation.

The operator-attested user information can include, but is not limited to, a location of a user device that can be correlated to where the user also is located, a device type of the user device, a subscriber identity module ("SIM") authentication, an Internet browsing behavior of the user, and the like. In some embodiments, the operator-attested user information includes a location of the user device within a mobile telecommunications network operated by the mobile network operator. The location can be part of a movement behavior model of the user as the user moves through the network over time. In some embodiments, the operator-attested user information includes a device type or a change from the device type to a new device type.

In some embodiments, the identity vault service system can determine whether to allow access to at least the portion of the trusted digital identity of the user based upon consent provided by the user. In these embodiments, the identity vault service system can generate a consent request directed to the user. The identity vault service system can send the consent request to a user device associated with the user. The identity vault service system can receive a consent response from the user device associated with the user. The consent response can indicate whether the user permits access to at least the portion of the trusted digital identity of the user.

In some embodiments, the identity vault service system can add an entry into a distributed ledger protected by a blockchain. The entry can identify to the user who the third party is, when the third party made the identity access request, and for what reason the third party made the identity access request. The user can access the distributed ledger to view the entry.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
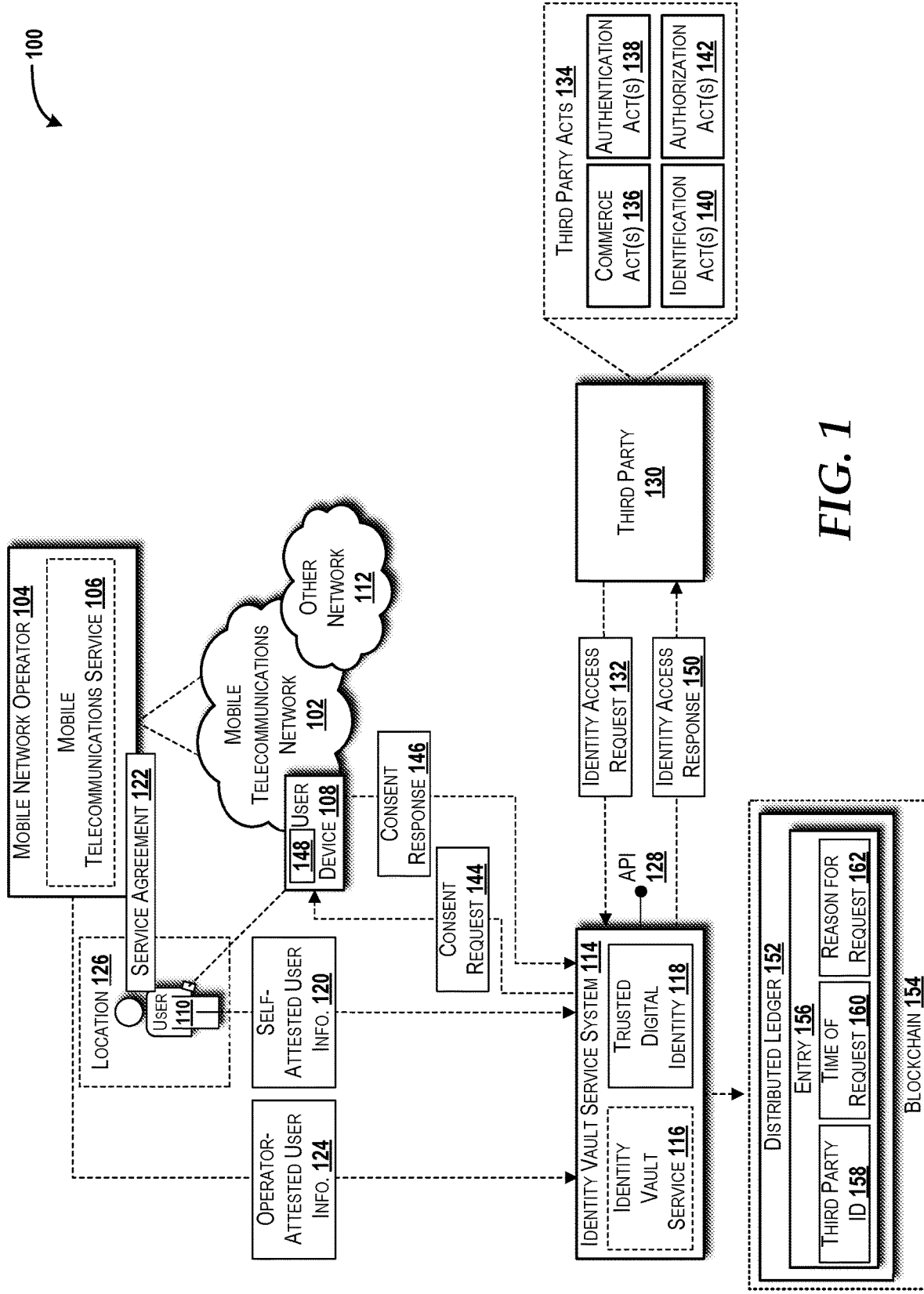
FIG. 1 is a block diagram illustrating aspects of an illustrative operating environment for various concepts disclosed herein.

Turning now to FIG. 1, an operating environment 100 in which embodiments of the concepts and technologies disclosed herein will be described. The illustrated operating environment 100 includes a mobile telecommunications network 102 operated, at least in part, by a mobile network operator 104 to provide a mobile telecommunications service 106 via user devices, such as a user device 108, to users, such as a user 110. The mobile telecommunications network 102 can be a single network or combination of multiple networks that utilize any wireless communications technology or combination of wireless communications technologies such as, but not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The mobile telecommunications network 102 can support various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data described herein can be exchanged over the mobile telecommunications network 102 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. The mobile telecommunications network 102 can be improved or otherwise evolve to accommodate changes in industry standards, such as to adhere to generational shifts in mobile telecommunications technologies, such as is colloquially known as 4G, 5G, etc. As such, the example technologies described herein should not be construed as limiting in any way.

The mobile telecommunications network 102 can facilitate communications between the user device 108 and other devices, such as other user devices (not shown) operating on the mobile telecommunications network 102, and/or one or more other devices and/or systems operating on one or more other networks 112. The other network(s) 112 can be or can include telecommunications networks, the Internet, other packet data networks, any other network disclosed herein, combinations thereof, and the like. The mobile network operator 104, in addition to operating the mobile telecommunications network 102 to provide the mobile telecommunication service 106 to the user 110, also may own the mobile telecommunications network 102 or at least a portion thereof, although this is not necessarily the case. In some implementations, the mobile network operator 104 can jointly operate the mobile telecommunications network 102 with one or more additional operators, vendors, and/or other entities (not shown in the illustrated example). For purposes of illustration and ease of explanation, the mobile telecommunications network 102 will be described as being owned and operated by the mobile network operator 104. In addition, the mobile network operator 104 can control operations of an identity vault service system 114 to perform operations consistent with the concepts and technologies disclosed herein.

The mobile network operator 104 provides an identity vault service 116 via the identity vault service system 114. The identity vault service 116 creates a trusted digital identity 118 for the user 110. The mobile network operator 104 underwrites the trusted digital identity 118 based, in part, upon self-attested user information 120 provided by the user 110 as part of information collected to form, at least in part, a service agreement 122 for the mobile telecommunications service 106 and the identity vault service 116. The service agreement 122 can be created as new, updated, renewed, or otherwise modified over time to make changes based upon the specific terms and conditions the mobile network operator 104 and the user 110 agree to for a specified period of time. The self-attested user information 120 can include any information associated with the identity of the user 110 that the user 110 attests to be true and accurate. The self-attested user information 120 can include, but is not limited to, home address, work address, billing address, credit card information, bank account information, device type, primary service area (e.g., home), secondary service area (e.g., work), emergency contact information, and the like. The mobile network operator 104 can validate the self-attested user information 120 or at least a portion thereof during a customer account onboarding process, a credit check, a government-issued ID check, and/or another similar process alternative to or in addition to creation, update, renewal, or modification to the service agreement 122.

The mobile network operator 104 underwrites the trusted digital identity 118 further based, in part, upon operator-attested user information 124 derived from the mobile telecommunications network 102 and the relationship maintained between the user 110 and the mobile network operator 104 in accordance with the service agreement 122. The operator-attested user information 124 can include any information associated with the identity of the user 110 that the mobile network operator 104 attests to be true and accurate. The operator-attested user information 124 may commonly include, but is not limited to, a location 126 of the user device 108 that can be correlated to where the user 110 is located, a device type of the user device 108, a subscriber identity module ("SIM") authentication, an Internet browsing behavior of the user 110, correlations of device sales with detected device type when the user 110 accesses the mobile telecommunications network 102, and the like. SIM authentication can be used to establish time-sensitive access tokens that can be associated with subscriber network information. Typical SIM authentication does not continue to leverage knowledge of the user 110 for identification purposes.

The location 126 of the user device 108 can be a network location derived by the mobile telecommunications network 102 based upon cell-ID, tracking area, and/or any other network location processing capability known to those skilled in the art. Although the user device 108 can, in some embodiments, include a global positioning system ("GPS") component that can determine the location 126, reliance on such technology is subject to spoofing, and the mobile network operator 104 cannot underwrite the trusted digital identity 118 based upon location information obtained from the user device 108. Network-initiated location determination techniques, such as those initiated by the mobile telecommunications network 102 that instruct the user device 108 to perform one or more tests and/or other functions in support of the mobile telecommunication network 102 determining the location 126 of the user device 108, however, can be used by the mobile network operator 104 to underwrite the trusted digital identity 118. The location 126 can be provided as part of the operator-attested user information 124 to the identity vault service system 114. The identity vault service system 114 can use the identity vault service 116 to create a movement behavior model using artificial intelligence and machine learning with the location 126 (e.g., in latitude and longitude coordinates) as part of a training set for the movement behavior model. The mobile telecommunications network 102 can sample the location 126 as the user 110, accompanied by the user device 108, moves throughout the mobile telecommunication network 102, and over time, the movement behavior model can be used to accurately predict where the user 110 will be located at a given time. Knowledge of the location 126 can be used, in part, to create the trusted digital identity 118 for the user 110 and, if necessary, to reaffirm the trustworthiness of the trusted digital identity 118 from time to time.

The user device 108 can have several identifying characteristics, such as device type, International Mobile Equipment Identity ("IMEI"), manufacturer, model name, model number, and serial number that can identify the user device 108 with varying specificity. These identifying characteristics, however, are subject to theft, reproduction, spoofing, and other forms of fraud. Other than the user 110, who may be spoofed, the mobile network operator 104 is the only entity that knows when the user device 108 has changed. This knowledge can be provided as part of the operator-attested user information 124 to the identity vault service system 114. The frequency of device changes over time can be used by the identity vault service 116 as a factor for use in machine learning for creation of the trusted digital identity 118. Anomalies can be used by the identity vault service system 114 to flag certain activity as potentially fraudulent and deny access to user identity information associated with such a device change request. An anomaly can be an uncharacteristic device change frequency, for example. Another example of an anomaly can be access by the same device IMEI to the mobile telecommunications network 102 at geographically disparate locations in a time period insufficient to account for travel. The age of the IMEI and/or IMSI associated with an account also may be indicative of a potential risk. Another anomaly can be when the primary use location(s) of the user device 108 is not within the area code associated with an account (e.g., as specified in the service agreement 122) and/or when network attach location habits of the user device 108 exhibit anomaly behavior.

The identity vault service system 114 can collect the self-attested user information 120 provided by the user 110 and the operator-attested user information 124 provided by the mobile network operator 104. The identity vault service system 114 can create the trusted digital identity 118 of the user 110 based upon the self-attested user information 120 and the operator-attested user information 124. The identity vault service system 114 can expose an application programming interface ("API") or other interface 128 through which a third party 130 can submit an identity access request 132 to the identity vault service system 114. The identity access request 132 is a request for access to at least a portion of the trusted digital identity 118 of the user 110 for use by the third party 130 in performance of one or more third party acts 134, such as, for example, one or more commerce acts 136, one or more authentication acts 138, one or more identification acts 140, one or more authorization acts 142, combinations thereof, and the like. The third party 130 can be any entity that is different from the mobile network operator 104 and the user 110, such as, for example, a different mobile network operator, a different user, a service provider, a financial institution, a business, or the like. The type of third party 130 and the type of third party act 134 are inconsequential to performance of the concepts and technologies disclosed herein, and as such, the examples provided herein should not be construed as being limiting in any way.

In response to the identity access request 132, the identity vault service system 114 can determine whether to allow access to at least the portion of the trusted digital identity 118 of the user 110. The identity vault service system 114 can determine whether to allow access to at least the portion of the trusted digital identity 118 of the user 110 based upon consent provided by the user 110. In particular, the identity vault service system 114 can generate a consent request 144 directed to the user 110 and can send the consent request 144 to the user device 108. The consent request 144 can identify the portion of the trusted digital identity 118, the third party 130 that is requesting access to the portion of the trusted digital identity 118, and whether the third party 130 has requested permission to distribute the portion of the trusted digital identity 118 outside of networks, systems, and otherwise beyond control of the third party 130. In response to the consent request 144, the identity vault service system 114 can receive a consent response 146 from the user device 108. The consent response 146 can indicate whether the user 110 permits access to at least the portion of the trusted digital identity 118 requested by the third party 130 in the identity access request 132.

The user device 108 can execute, via one or more processors (best shown in FIG. 5) an identity vault service client 148 that processes incoming consent requests, such as the consent request 144, to extract the portion of the trusted digital identity 118 for which consent was requested, to extract relevant third party information that identifies the third party 130 that requested the portion of the trusted digital identity 118, to extract any additional permission(s) requested by the third party 130 (e.g., permission for distribution outside the purview of the third party 130), and to present the extracted content of the consent request 144 to the user 110. The user device 108 can present the content of the consent request 144 to the user 110 in any visual, auditory, tactile, other sensory manner, or any combination thereof.

In some embodiments, the identity vault service client 148 can provide a graphical user interface ("GUI") through which a visual representation of the content of the consent request 144 can be presented on a display of the user device 108. The GUI can include interface elements that allow the user to respond to the consent request 144 to permit or deny access to at least the portion of the trusted digital identity 118 of the user 110. In some embodiments, the identity vault service client 148 can utilize a notification system, such as the notification systems common in mobile operating systems (e.g., the IOS family of operating systems from APPLE INC. and the ANDROID OS family of operating systems from GOOGLE INC.) to notify the user 110 of the consent request 144. In some embodiments, an operating system (best shown in FIG. 5) of the user device 108 can include the functionality of the identity vault service client 148, or this functionality can be part of a firmware of the user device 108. In this manner, the notification of the consent request 144 can be sent natively by the operating system. This configuration might be offered for devices sold or leased by the mobile network operator 104, for example.

In some embodiments, the consent request 144 can be a text message sent by the identity vault service system 114 to the user device 108 via the mobile telecommunications network 102. The user device 108 can receive the consent request 144 as a text message and can execute, via one or more processors, a messaging application to present text-based content to convey the information contained in the consent request 144. The text associated with the consent request 144, in these embodiments, might additionally include one or more response options—for example, "Respond with 'Yes' to grant permission to Third Party or 'No' to deny permission to Third Party."

In response to the consent request 144, the user device 108 receives input from the user 110 indicative of whether the user grants or denies the third party 130 permission to access at least the portion of the trusted digital identity of the user 110. The user device 108 can generate the consent response 146 and can send the consent response 146 to the identity vault service system 114. The identity vault service system 114 can receive the consent response 146 from the user device 108 and can generate an identity access response 150. The identity access response 150 can include an indication of whether access to at least the portion of the trusted digital identity of the user 110 has been granted by the identity vault service system 114 based upon consent provided by the user 110. The third party 130 can receive the identity access response 150 and can operate in accordance with the identity access response 150. For example, if the identity access response 150 indicates that access to at least the portion of the trusted digital identity of the user 110 has been granted, the identity access response 150 also will include at least the portion of the trusted digital identity 118 of the user 110 for the third party 130 to utilize in accordance with the identity access request 132. If, however, the identity access response 150 indicates that access to at least the portion of the trusted digital identity of the user 110 has been denied, the third party 130 can be notified that the identity access request 132 was denied.

The identity vault service system 114 can utilize a distributed ledger 152 protected by a blockchain 154 technology to allow for controlled access to the trusted digital identity 118. The concepts of distributed ledger and blockchain technology are well-known in the art. Those skilled in the art will appreciate, however, the contributions of the concepts and technologies disclosed herein to the state of this art. In particular, the concepts and technologies disclosed herein allow an identity owner, such as the user 110 as the owner of the trusted digital identity 118, to utilize the distributed ledger 152 under the protection provided by the blockchain 154 to securely view who has accessed at least a portion of the trusted digital identity 118, when, and for what reason. In the illustrated example, the distributed ledger 152 includes an entry 156 corresponding to the identity access request 132 made by the third party 130. The entry 156 includes a third party ID 158 that uniquely identifies the third party 130, a time of request 160 that specifies when the identity access request 132 sent by the third party 130 was received by the identity vault service system 114, and a reason for request 162 that specifies why the identity access request 132 was made by the third party 130.

Figure 2:
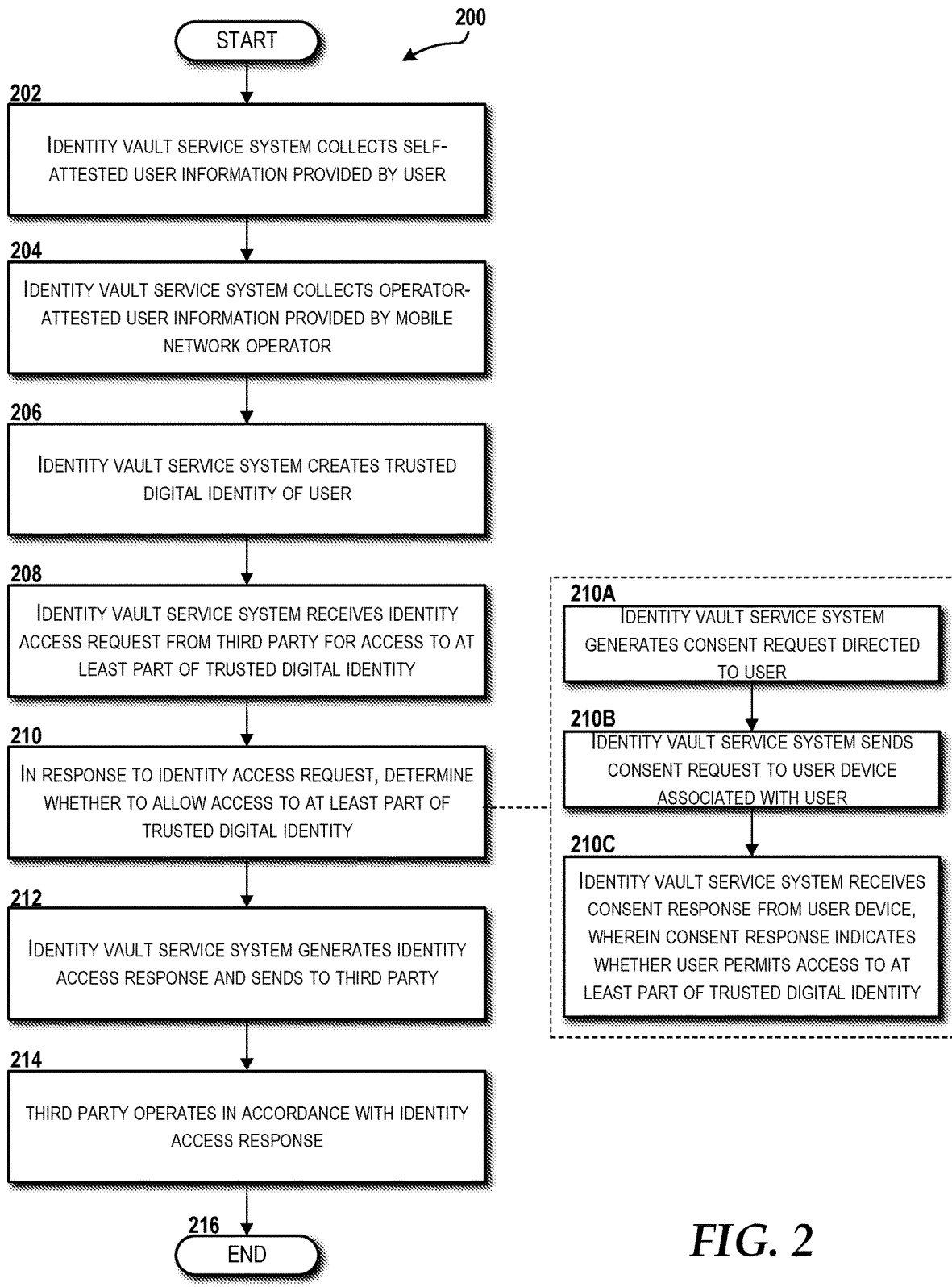
FIG. 2 is a flow diagram illustrating aspects of a method for providing an identity vault service from the perspective of an identity vault service system, according to an illustrative embodiment.

Turning now to FIG. 2, a flow diagram illustrating aspects of a method 200 for providing the identity vault service 116 from the perspective of the identity vault service system 114 will be described according to an illustrative embodiment. FIG. 2 will be described with additional reference to FIG. 1. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the identity vault service system 114 or the user device 108, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202, where the identity vault service system 114 collects the self-attested user information 120 provided by the user 110. The self-attested user information 120 can be provided by the user 110 as part of information collected to form, at least in part, the service agreement 122 for the mobile telecommunications service 106 and the identity vault service 116. The service agreement 122 can be created as new, updated, renewed, or otherwise modified over time to make changes based upon the specific terms and conditions the mobile network operator 104 and the user 110 agree to for a specified period of time. The self-attested user information 120 can include any information associated with the identity of the user 110 that the user 110 him/herself attests to be true and accurate. The self-attested user information 120 may commonly include, but is not limited to, home address, work address, billing address, credit card information, bank account information, device type, primary service area (e.g., home), secondary service area (e.g., work), emergency contact information, and the like.

From operation 202, the method 200 proceeds to operation 204, where the identity vault service system 114 collects the operator-attested user information 124 provided by the mobile network operator 104. The operator-attested user information 124 can include any information associated with the identity of the user 110 that the mobile network operator 104 attests to be true and accurate. The operator-attested user information 124 may commonly include, but is not limited to, the location 126 of the user device 108 that can be correlated to where the user 110 also is located, the device type of the user device 108, SIM authentication, Internet browsing behavior of the user 110, and the like.

From operation 204, the method 200 proceeds to operation 206, where the identity vault service system 114 creates the trusted digital identity 118 of the user 110 based upon the self-attested user information 120 and the operator-attested user information 124. In some embodiments, the identity vault service system 114 creates the trusted digital identity 118 of the user 110 via implementation of one or more machine learning models created by a machine learning system (best shown in FIG. 8) based upon one or more machine learning algorithms. In addition to the self-attested user information 120 and the operator-attested user information 124, the identity vault service system 114, in some embodiments, can append contextual user behavior data obtained from third party platforms where user identity information was used.

From operation 206, the method 200 proceeds to operation 208, where the identity vault service system 114 receives the identity access request 132 from the third party 130 for access to at least part of the trusted digital identity 118. In some embodiments, the identity vault service system 114 can expose the API 128 through which the third party 130 can submit the identity access request 132. The third party 130 can submit the identity access request 132 to the third party 130 via other methods, and as such, the examples provided herein should not be construed as being limiting in any way.

From operation 208, the method 200 proceeds to operation 210, where, in response to the identity access request 132, the identity vault service system 114 determines whether to allow access to at least part of the trusted digital identity 118. The operation 210 includes sub-operation 210A, where the identity vault service system 114 generates the consent request 144 directed to the user 110. The consent request 144 can identify the portion of the trusted digital identity 118, the third party 130 that is requesting access to the portion of the trusted digital identity 118, and whether the third party 130 has requested permission to distribute the portion of the trusted digital identity 118 outside of networks, systems, and otherwise beyond control of the third party 130. From sub-operation 210A, the method 200 proceeds to sub-operation 210B, where the identity vault service system 114 sends the consent request 144 to the user device 108. From sub-operation 210B, the method 200 proceeds to operation 210C, where the identity vault service system 114 receives the consent response 146 from the user device 108. The consent response 146 can indicate whether the user 110 permits access to at least the portion of the trusted digital identity 118 requested by third party 130 in the identity access request 132.

From operation 210, the method 200 proceeds to operation 212, where the identity vault service system 114 generates the identity access response 150 and sends the identity access response 150 to the third party 130. From operation 212, the method 200 proceeds to operation 214, where the third party 130 can receive and operate in accordance with the identity access response 150. For example, if the identity access response 150 indicates that access to at least the portion of the trusted digital identity of the user 110 has been granted, the identity access response 150 also will include at least the portion of the trusted digital identity 118 of the user 110 for the third party 130 to utilize in accordance with the identity access request 132. If, however, the identity access response 150 indicates that access to at least the portion of the trusted digital identity of the user 110 has been denied, the third party 130 can be notified that the identity access request 132 was denied. From operation 214, the method 200 proceeds to operation 216, where the method 200 ends.

Figure 3:
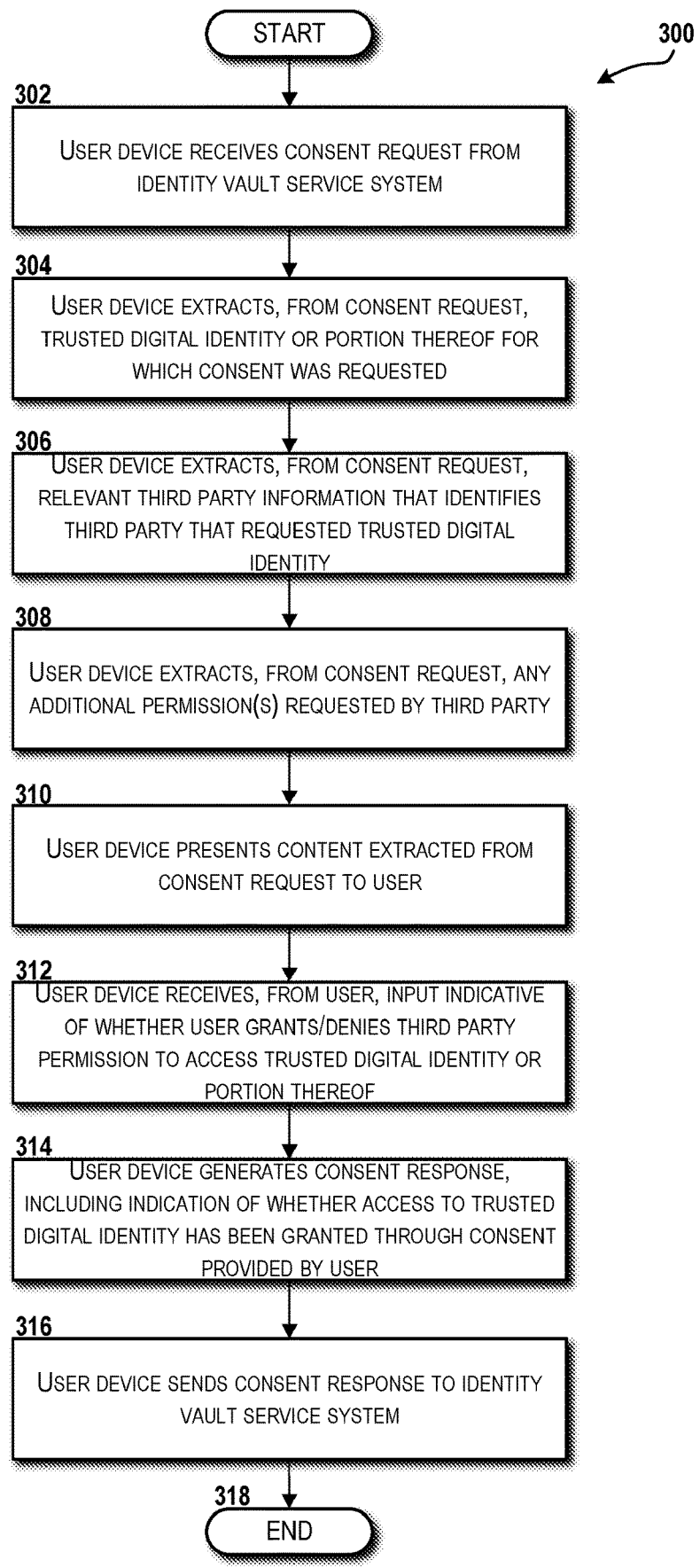
FIG. 3 is a flow diagram illustrating aspects of a method for providing an identity vault service from the perspective of a user device, according to an illustrative embodiment.

Turning now to FIG. 3, a method 300 for providing the identity vault service 116 from the perspective of the user device 108 will be described, according to an illustrative embodiment. The method 300 will be described with reference to FIG. 3 and further reference to FIG. 1. The method 300 begins and proceeds to operation 302, where the user device 108 receives the consent request 144 from the identity vault service system 114. From operation 302, the method 300 proceeds to operation 304, where the user device 108 extracts, from the consent request 144, the trusted digital identity 118 or a portion thereof for which consent was requested. From operation 304, the method 300 proceeds to operation 306, where the user device 108 extracts, from the consent request 144, relevant third party information that identifies the third party 130 that requested the trusted digital identity 118. From operation 306, the method 300 proceeds to operation 308, where the user device 108 extracts, from the consent request 144, any additional permission(s) requested by the third party 130, such as, for example, a permission for distribution outside the purview of the third party 130. From operation 308, the method 300 proceeds to operation 310, where the user device 108 presents the content extracted from the consent request 144 to the user 110. The user device 108 can present the content of the consent request 144 to the user 110 in any visual, auditory, tactile, other sensory manner, or any combination thereof.

From operation 310, the method 300 proceeds to operation 312, where the user device 108 receives, from the user 110, input indicative of whether the user grants or denies the third party 130 permission to access the trusted digital identity 118 or portion thereof. From operation 312, the method 300 proceeds to operation 314, where the user device 108 generates the consent response 146, including the indication of whether access to the trusted digital identity 118 has been granted through consent provided by the user 110. From operation 314, the method 300 proceeds to operation 316, where the user device 108 sends the consent response 146 to the identity vault service system 114. From operation 316, the method 300 proceeds to operation 318, where the method 300 ends.

Figure 4:
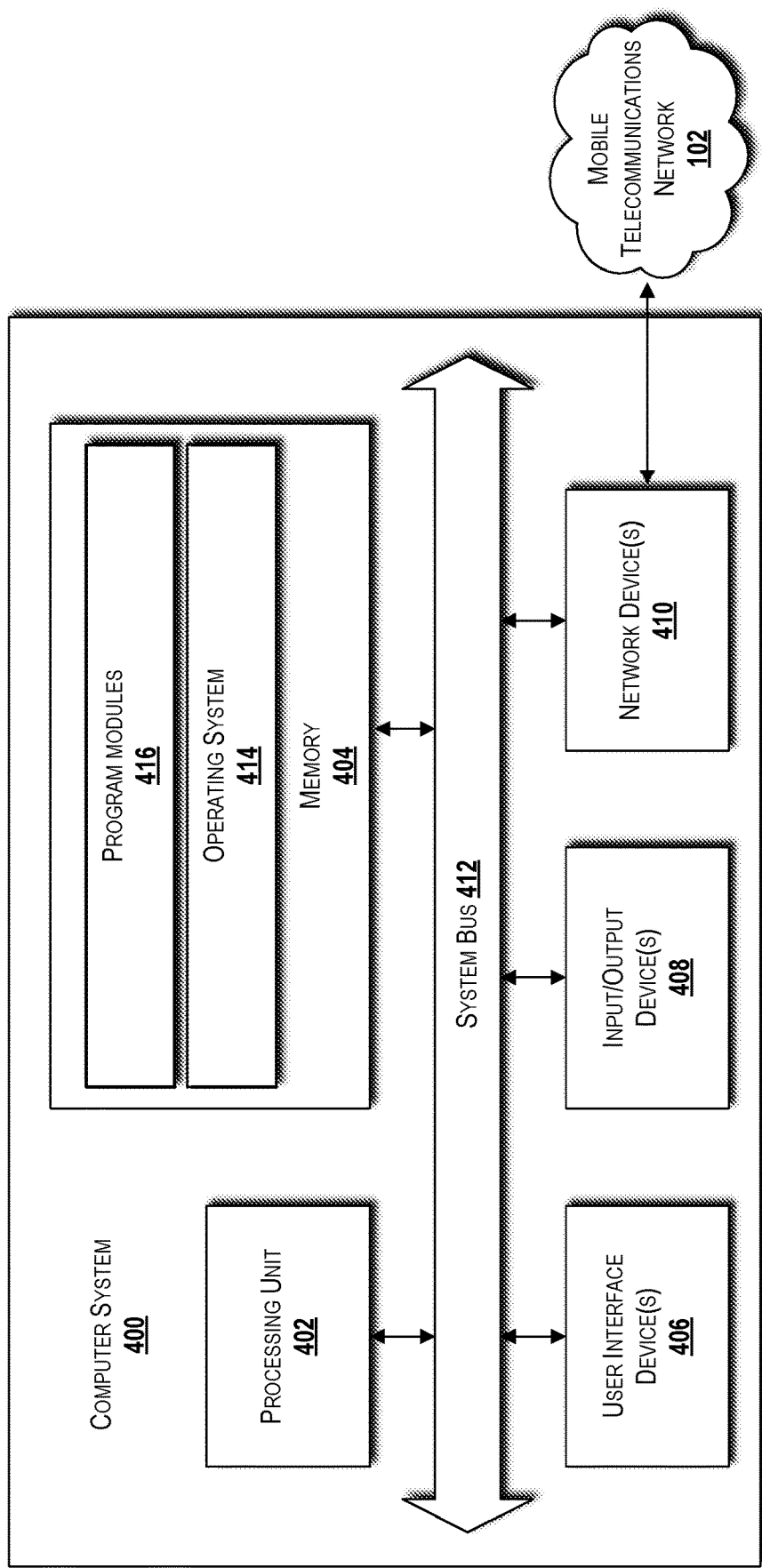
FIG. 4 is a block diagram illustrating an example computer system, according to some illustrative embodiments.

Turing now to FIG. 4, a block diagram illustrating a computer system 400 configured to provide the functionality described herein in accordance with various embodiments of the concepts and technologies disclosed herein. In some embodiments, the user device 108, the identity vault service system 114, and/or other devices/systems, such as those associated with the third party 130, can be configured as and/or can have an architecture similar or identical to the computer system 400 described herein with respect to FIG. 4. It should be understood, however, that the user device 108, the identity vault service system 114, and/or other devices/systems, such as those associated with the third party 130, may or may not include the functionality described herein with reference to FIG. 4.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer system 400.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules described herein, such as to implement the identity vault service 116 for the identity vault service system 114 or the identity vault service client 148 for the user device 108. By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer to output data.

The network devices 410 enable the computer system 400 to communicate with other networks or remote systems via one or more networks, such as the mobile telecommunications network 102. Examples of the network devices 410 include, but are not limited to, a modem, a radio frequency ("RF") or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN, such as represented by the other network 112 in FIG. 1.

Figure 5:
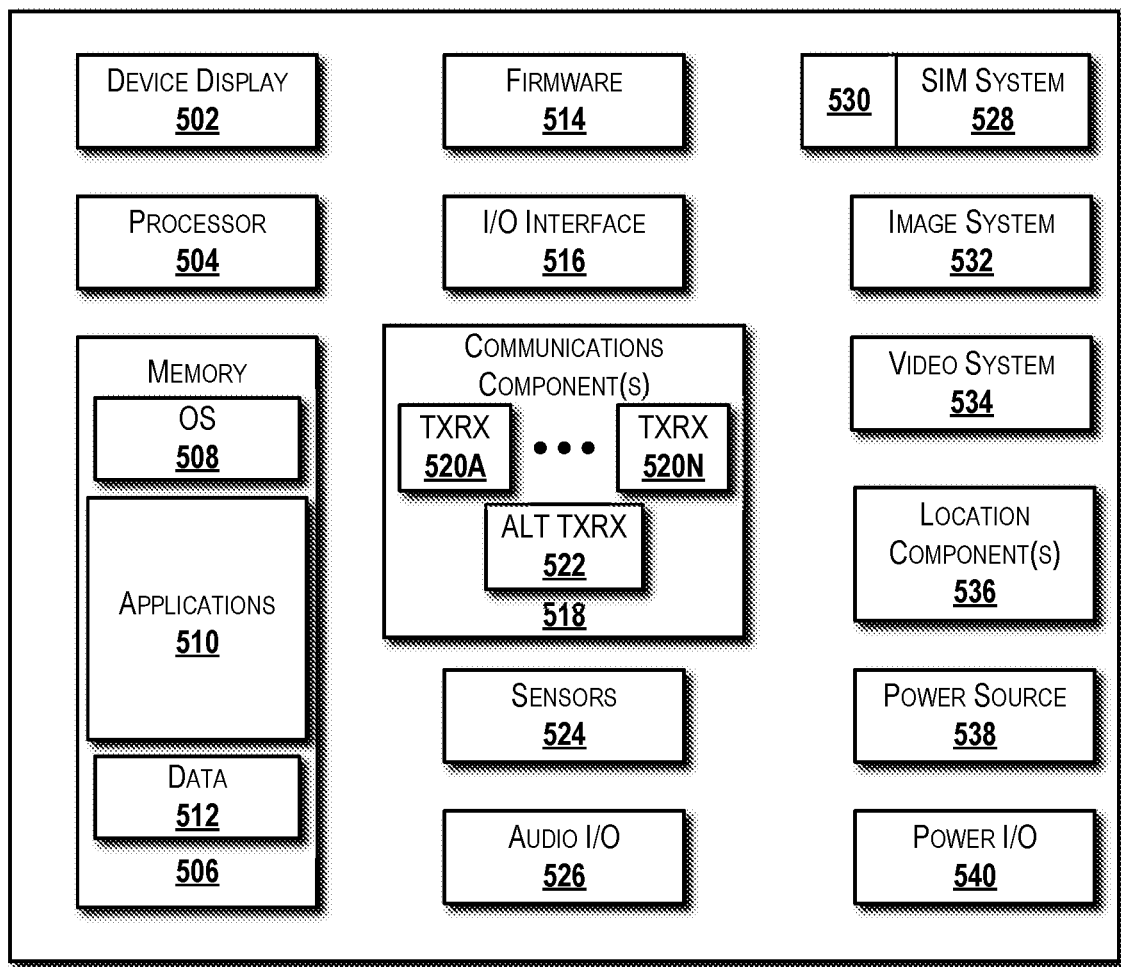
FIG. 5 is a block diagram illustrating an example mobile device, according to some illustrative embodiments.

Turning now to FIG. 5, an illustrative mobile device 500 and components thereof will be described. In some embodiments, the user device 108 described above with reference to FIG. 1 can be configured as and/or can have an architecture similar or identical to the mobile device 500 described herein with respect to FIG. 5. It should be understood, however, that the user device 108 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a device display 502 for displaying data, including, for example, content associated with the consent request 144 as described herein above. According to various embodiments, the device display 502 can be configured to display any information. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting with data. In accordance with the concepts and technologies disclosed herein, the UI application can enable the user to response to the consent request 144. The UI application can be executed by the processor 504 to aid a user in answering/initiating calls, entering/deleting other data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500.

According to various embodiments, the applications 510 can include, for example, the identity vault service client 148, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It should be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the mobile telecommunications network 102. In some embodiments, the communications component 518 includes a multimode communications subsystem for facilitating communications via the cellular network and one or more other networks, such as the other network 112.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMAONE, CDMA2000, LTE, and various other 2G, 2.5G, 3G, 4G, 5G and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSDPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. One or more of the sensors 524 can be used to detect movement of the mobile device 500. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, CCDs, combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a specific location of the mobile device 500. According to various embodiments, the location components 536 can send and/or receive signals from GPS devices, A-GPS devices, WI-FI/WIMAX and/or cellular network triangulation data, combinations thereof, and the like. The location component 536 also can be configured to communicate with the communications component 518 to retrieve triangulation data from the mobile telecommunications network 102 for determining a location, such as the location 126, of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
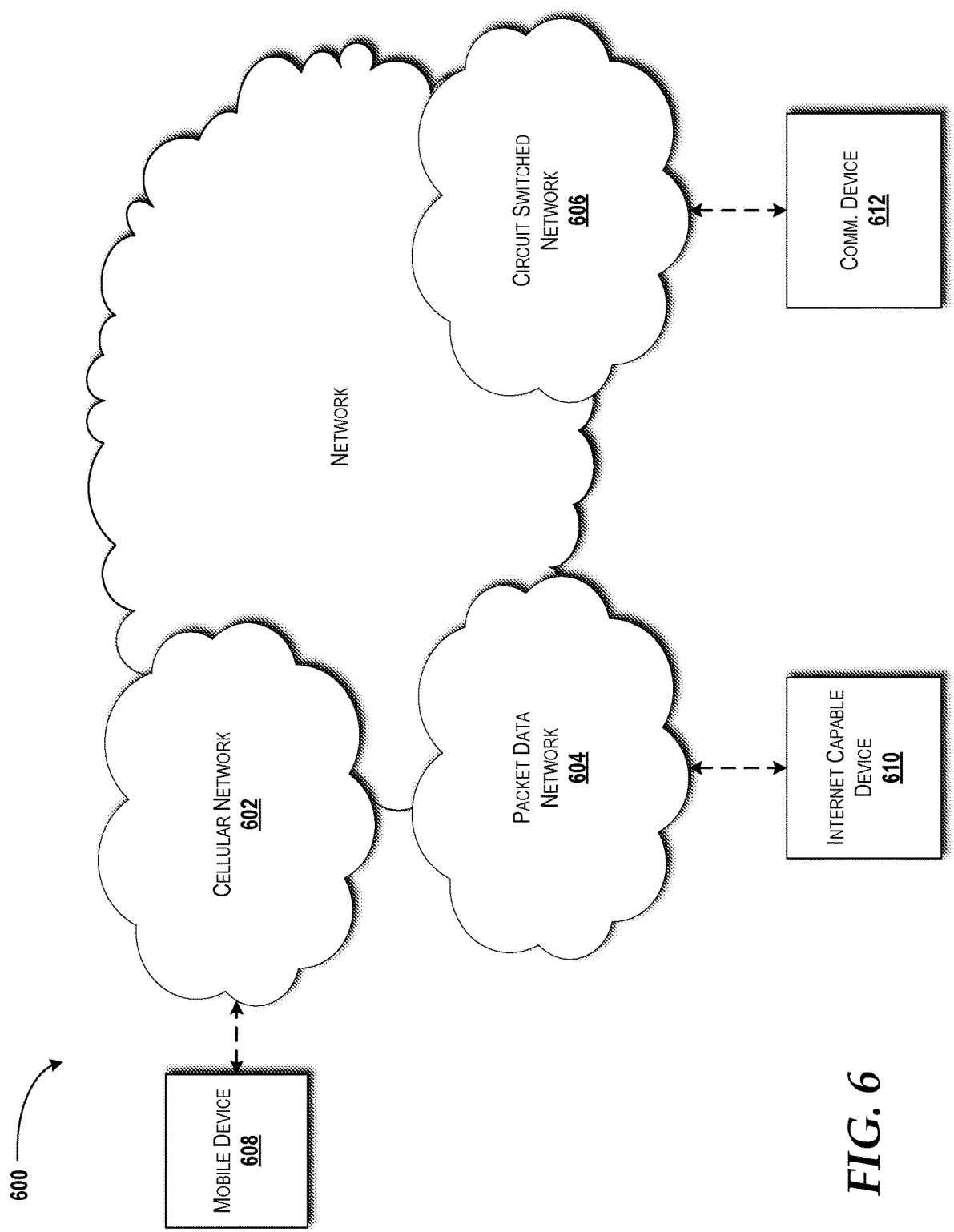
FIG. 6 schematically illustrates a network, according to an illustrative embodiment.

Turning now to FIG. 6, additional details of an embodiment of the network 600 are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the user device 108, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards. In some embodiments, the mobile telecommunications network 102 can be configured like the cellular network 602.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. In some embodiments, the other network 112 can be configured like the packet data network 604.

The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 608, for example, the user device 108, a personal computer ("PC"), a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the other network 112 may be used to refer broadly to any combination of the networks 602, 604, 606. It should be appreciated that substantially all of the functionality described with reference to the other network 112 can be performed by the cellular network 602, the packet data network 604, and/or the circuit switched network 606, alone or in combination with additional and/or alternative networks, network elements, and the like.

Figure 7:
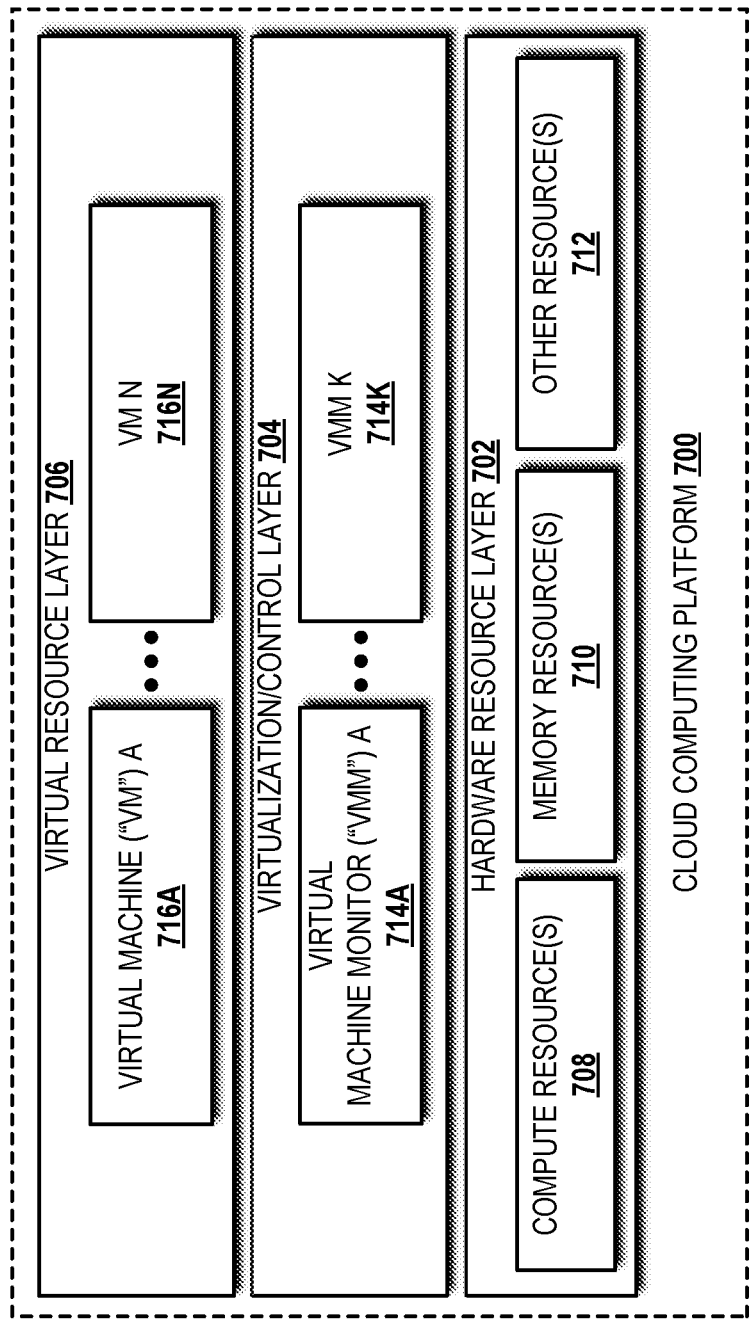
FIG. 7 is a block diagram illustrating a cloud computing platform capable of implementing aspects of the concepts and technologies disclosed herein.

Turning now to FIG. 7, a cloud computing platform 700 capable of implementing aspects of the concepts and technologies disclosed herein will be described, according to an illustrative embodiment. In some embodiments, the identity vault service system 114 can be implemented, at least in part on the cloud computing platform 700. Those skilled in the art will appreciate that the illustrated cloud computing platform 700 is a simplification of but one possible implementation of an illustrative cloud computing environment, and as such, the cloud computing platform 700 should not be construed as limiting in any way.

The illustrated cloud computing platform 700 includes a hardware resource layer 702, a virtualization/control layer 704, and a virtual resource layer 706 that work together to perform operations as will be described in detail herein. While connections are shown between some of the components illustrated in FIG. 7, it should be understood that some, none, or all of the components illustrated in FIG. 7 can be configured to interact with one other to carry out various functions described herein. In some embodiments, the components are arranged so as to communicate via one or more networks (not shown). Thus, it should be understood that FIG. 7 and the following description are intended to provide a general understanding of a suitable environment in which various aspects of embodiments can be implemented, and should not be construed as being limiting in any way.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUAL-COMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716"). Operations of the identity vault service 116 can be performed, at least in part, by any number of VMs 716.

Figure 8:
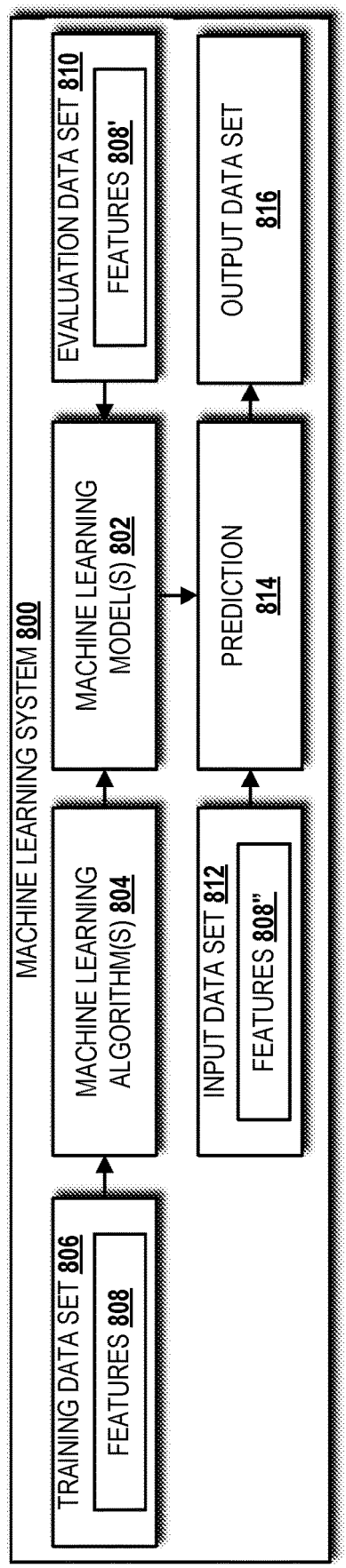
FIG. 8 is a block diagram illustrating a machine learning system capable of implementing aspects of the concepts and technologies disclosed herein.

Turning now to FIG. 8, a machine learning system 800 capable of implementing aspects of the embodiments disclosed herein will be described. The illustrated machine learning system 800 includes one or more machine learning models 802, such as one or more trusted digital identity creation models. The machine learning models 802 can include supervised and/or semi-supervised learning models. The machine learning model(s) 802 can be created by the machine learning system 800 based upon one or more machine learning algorithms 804. The machine learning algorithm(s) 804 can be any existing, well-known algorithm, any proprietary algorithms, or any future machine learning algorithm. Some example machine learning algorithms 804 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 804 based upon the problem(s) to be solved by machine learning via the machine learning system 800.

The machine learning system 800 can control the creation of the machine learning models 802 via one or more training parameters. In some embodiments, the training parameters are selected modelers at the direction of the mobile network operator 104, for example. Alternatively, in some embodiments, the training parameters are automatically selected based upon data provided in one or more training data sets 806. The training parameters can include, for example, a learning rate, a model size, a number of training passes, data shuffling, regularization, and/or other training parameters known to those skilled in the art. The training data in the training data sets 806 can be collected from multiple users, including the user 110, of the mobile telecommunications service 106. The training data can include data such as, but not limited to, the self-attested user information 120, the operator-attested user information 124, context-based user behavior data, application activity logs, location data, previous identity usage data, and the like.

The learning rate is a training parameter defined by a constant value. The learning rate affects the speed at which the machine learning algorithm 804 converges to the optimal weights. The machine learning algorithm 804 can update the weights for every data example included in the training data set 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data set 806. A greater the number of features 808 yields a greater number of possible patterns that can be determined from the training data set 806. The model size should be selected to balance the resources (e.g., compute, memory, storage, etc.) needed for training and the predictive power of the resultant machine learning model 802.

The number of training passes indicates the number of training passes that the machine learning algorithm 804 makes over the training data set 806 during the training process. The number of training passes can be adjusted based, for example, on the size of the training data set 806, with larger training data sets being exposed to fewer training passes in consideration of time and/or resource utilization. The effectiveness of the resultant machine learning model 802 can be increased by multiple training passes.

Data shuffling is a training parameter designed to prevent the machine learning algorithm 804 from reaching false optimal weights due to the order in which data contained in the training data set 806 is processed. For example, data provided in rows and columns might be analyzed first row, second row, third row, etc., and thus an optimal weight might be obtained well before a full range of data has been considered. By data shuffling, the data contained in the training data set 806 can be analyzed more thoroughly and mitigate bias in the resultant machine learning model 802.

Regularization is a training parameter that helps to prevent the machine learning model 802 from memorizing training data from the training data set 806. In other words, the machine learning model 802 fits the training data set 806, but the predictive performance of the machine learning model 802 is not acceptable. Regularization helps the machine learning system 800 avoid this overfitting/memorization problem by adjusting extreme weight values of the features 808. For example, a feature that has a small weight value relative to the weight values of the other features in the training data set 806 can be adjusted to zero.

The machine learning system 800 can determine model accuracy after training by using one or more evaluation data sets 810 containing the same features 808' as the features 808 in the training data set 806. This also prevents the machine learning model 802 from simply memorizing the data contained in the training data set 806. The number of evaluation passes made by the machine learning system 800 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data set 806 and the features 808' of the evaluation data set 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that aspects of an identity vault service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   collecting, by an identity vault service system comprising a processor, self-attested user information provided by a user, wherein the identify vault service system is associated with a mobile network operator, and wherein the self-attested user information is provided by the user as part of information collected to form, at least in part, an agreement between the user and the mobile network operator for the mobile network operator to provide a mobile telecommunications service to the user;
   collecting, by the identity vault service system, operator-attested user information provided by the mobile network operator, wherein the operator-attested user information is associated with the user and is derived from a mobile telecommunications network operated, at least in part, by the mobile network operator to provide the mobile telecommunications service to the user;
   creating, by the identity vault service system, a trusted digital identity of the user based upon the self-attested user information and the operator-attested user information;
   receiving, by the identity vault service system, an identity access request from a third party, wherein the identity access request is for access to at least a first portion of the trusted digital identity for use by the third party in performance of an act;
   in response to the identity access request, determining, by the identity vault service system, whether to allow access to at least the first portion of the trusted digital identity of the user;
   determining, by the identity vault service system, an anomaly associated with a second portion of the trusted digital identity of the user; and
   in response to determining the anomaly, denying, by the identity vault service system, access to the second portion of the trusted digital identity of the user determined to be associated with the anomaly.

2. The method of claim 1, wherein the agreement is further for an identity vault service provided by the mobile network operator to the user via the identity vault service system.

3. The method of claim 2, wherein the self-attested user information is further provided by the user for the mobile network operator to provide the identity vault service.

4. The method of claim 1, wherein the operator-attested user information comprises a location of a user device associated with the user within the mobile telecommunications network.

5. The method of claim 4, wherein the location is part of a movement behavior model of the user as the user moves through the mobile telecommunications network over time.

6. The method of claim 1, wherein the operator-attested user information comprises a device type or a change from the device type to a new device type.

7. The method of claim 1, wherein determining, by the identity vault service system, whether to allow access to at least the first portion of the trusted digital identity of the user comprises:
   generating, by the identity vault service system, a consent request directed to the user;
   sending, by the identity vault service system, the consent request to a user device associated with the user; and
   receiving, by the identity vault service system, a consent response from the user device associated with the user, wherein the consent response indicates whether the user permits access to at least the first portion of the trusted digital identity of the user.

8. The method of claim 1, wherein the act comprises a commerce act, an authorization act, an authentication act, or an identification act.

9. The method of claim 1, further comprises adding an entry into a distributed ledger protected by a blockchain, wherein the entry identifies to the user who the third party is, when the third party made the identity access request, and for what reason the third party made the identity access request.

10. A computer-readable storage medium comprising computer-executable instructions that, when executed by a processor of an identity vault service system, cause the processor to perform operations comprising:
   collecting self-attested user information provided by a user, wherein the identify vault service system is associated with a mobile network operator, and wherein the self-attested user information is provided by the user as part of information collected to form, at least in part, an agreement between the user and the mobile network operator for the mobile network operator to provide a mobile telecommunications service to the user;
   collecting operator-attested user information provided by the mobile network operator, wherein the operator-attested user information is associated with the user and is derived from a mobile telecommunications network operated, at least in part, by the mobile network operator to provide the mobile telecommunications service to the user;
   creating a trusted digital identity of the user based upon the self-attested user information and the operator-attested user information;
   receiving an identity access request from a third party, wherein the identity access request is for access to at least a first portion of the trusted digital identity for use by the third party in performance of an act;
   in response to the identity access request, determining whether to allow access to at least the first portion of the trusted digital identity of the user;
   determining an anomaly associated with a second portion of the trusted digital identity of the user; and
   in response to determining the anomaly, denying access to the second portion of the trusted digital identity of the user determined to be associated with the anomaly.

11. The computer-readable storage medium of claim 10, wherein the agreement is further for an identity vault service provided by the mobile network operator to the user via the identity vault service system.

12. The computer-readable storage medium of claim 11, wherein the self-attested user information is further provided by the user for the mobile network operator to provide the identity vault service.

13. The computer-readable storage medium of claim 10, wherein the operator-attested user information comprises a location of a user device associated with the user within the mobile telecommunications network.

14. The computer-readable storage medium of claim 13, wherein the location is part of a movement behavior model of the user as the user moves through the mobile telecommunications network over time.

15. The computer-readable storage medium of claim 10, wherein the operator-attested user information comprises a device type or a change from the device type to a new device type.

16. The computer-readable storage medium of claim 10, wherein determining whether to allow access to at least the first portion of the trusted digital identity of the user comprises:
   generating a consent request directed to the user;
   sending the consent request to a user device associated with the user; and
   receiving a consent response from the user device associated with the user, wherein the consent response indicates whether the user permits access to at least the first portion of the trusted digital identity of the user.

17. The computer-readable storage medium of claim 10, wherein the act comprises a commerce act, an authorization act, an authentication act, or an identification act.

18. The computer-readable storage medium of claim 10, wherein the operations further comprise adding an entry into a distributed ledger protected by a blockchain, wherein the entry identifies to the user who the third party is, when the third party made the identity access request, and for what reason the third party made the identity access request.

19. An identity vault service system comprising:
   a processor; and
   a memory comprising computer-executable instructions that, when executed by the processor, cause the processor to perform operations comprising
      collecting self-attested user information provided by a user, wherein the identify vault service system is associated with a mobile network operator, and wherein the self-attested user information is provided by the user as part of information collected to form, at least in part, an agreement between the user and the mobile network operator for the mobile network operator to provide a mobile telecommunications service to the user,
      collecting operator-attested user information provided by the mobile network operator, wherein the operator-attested user information is associated with the user and is derived from a mobile telecommunications network operated, at least in part, by the mobile network operator to provide the mobile telecommunications service to the user, creating a trusted digital identity of the user based upon the self-attested user information and the operator-attested user information, receiving an identity access request from a third party, wherein the identity access request is for access to at least a first portion of the trusted digital identity for use by the third party in performance of an act, in response to the identity access request,
generating a consent request directed to the user,
sending the consent request to a user device associated with the user, and
receiving a consent response from the user device associated with the user, wherein the consent response indicates whether the user permits access to at least the first portion of the trusted digital identity of the user, determining an anomaly associated with a second portion of the trusted digital identity of the user, and in response to determining the anomaly, denying access to the second portion of the trusted digital identity of the user determined to be associated with the anomaly.

20. The identity vault service system of claim 19, wherein:

the agreement is further for an identity vault service provided by the mobile network operator to the user via the identity vault service system;

the self-attested user information is further provided by the user for the mobile network operator to provide the identity vault service;

the operator-attested user information comprises a location of the user device associated with the user within the mobile telecommunications network, and the location is part of a movement behavior model of the user as the user moves through the mobile telecommunications network over time;

the operator-attested user information further comprises a device type or a change from the device type to a new device type; and the act comprises a commerce act, an authorization act, an authentication act, or an identification act.

* * * * *